Feb. 19, 1957      E. VALLAK      2,781,545

MACHINE FOR THE PRODUCTION OF MOLDED BOARDS

Filed April 5, 1955

INVENTOR:
ENN VALLAK,

BY

HIS AGENT.

United States Patent Office 2,781,545
Patented Feb. 19, 1957

2,781,545

MACHINE FOR THE PRODUCTION OF MOLDED BOARDS

Enn Vallak, Grythyttan, Sweden

Application April 5, 1955, Serial No. 499,454

Claims priority, application Sweden April 21, 1954

4 Claims. (Cl. 18—5)

This invention relates to a power operated machine for the production of molded boards, particularly feeder or sinkhead boards, from a pulverulent or finely divided or other moldable material. In connection with feeders or sinkheads the boards are made from combustible materials such as coal, charcoal, sawdust, or cokes, together with a binding agent, for instance waste sulphite lye.

The principal object of the invention is to provide a power operated machine of the kind stated in which, after having been completed in a mold, the boards can readily be transferred onto platforms or covers to be carried away on a supporting surface for subsequently subjecting the same to a drying or other treatment, without the necessity of carrying the mold away together with the boards, allowing the mold instead to be employed in the meanwhile for the production of further boards.

For the object stated, the apparatus according to the present invention comprises a mold structure which is angularly movable through an angle of at least about 180° about a substantially horizontal axis, and a cover plate or platform shaped to fit on the mold, the said cover plate or platform being angularly movably mounted on a preferably movable support, such as, for instance, a carriage, said cover or platform being angularly movable through an angle of at least about 180°, both together with the mold and independently thereof, also about a substantially horizontal axis which is approximately coaxial or parallel with the axis of angular motion of the mold.

One specific preferred embodiment of the invention will now be described by way of example in conjunction with the accompanying drawing in which.

Figure 1:
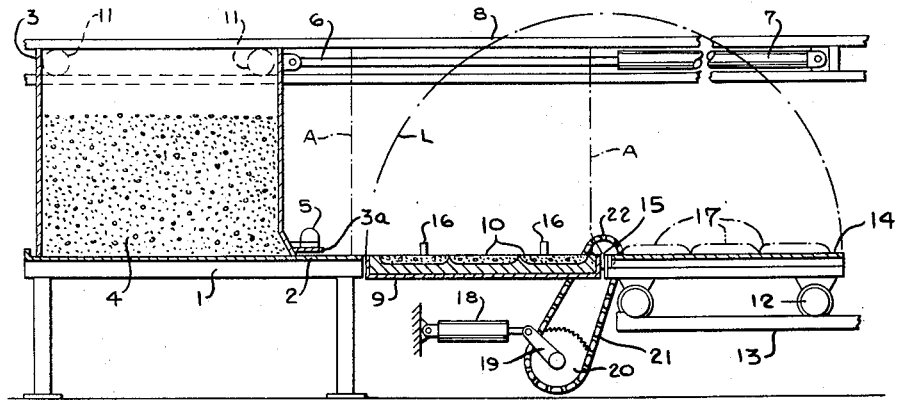
Fig. 1 is a side elevation, partly in section, of the apparatus according to the invention.
Figure 2:
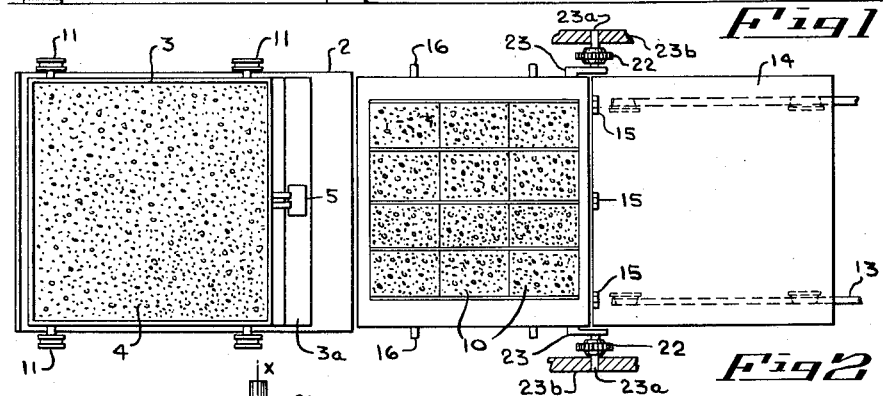
Fig. 2 is a plan view thereof.

Referring now to the drawing more specifically, numeral 1 designates a foundry stand or frame having a stationary supporting platform or table 2 along which a container 3 is movable, for instance by being suspended from wheels or rollers 11 adapted to travel on rails 8. Through a connecting rod 6 the container 3 is operatively connected to a hydraulic, pneumatic, mechanical or electric operating mechanism 7 adapted to reciprocate the container along the table and onto a mold 9 disposed on an adjacent frame or stand. If desired, a vibrator 5 may be mounted on a bracket 3a disposed, for example, at the lower portion of the container.

The top surface of the mold 9 has a number of depressions or compartments 10 each one corresponding in shape to the boards to be produced. At two of its lateral edges the mold is provided with hinges such as lugs 23 which carry horizontally extending trunnions 23a mounted in fixed bearings 23b. These trunnions, or one of them, at least, carries a sprocket 22 which through a chain 21 is driven by a second sprocket wheel 20 adapted by any suitable power mechanism to be rotated through a suitable angle so as to cause the mold to be moved angularly through an angle of approximately 180°, as indicated by the broken line L in Fig. 1. This power mechanism may consist, for example, of a piston movable in a hydraulic or pneumatic cylinder 18 and adapted to act on a crank 19 connected to the sprocket wheel 20.

A carriage 12 or any other conveying equipment is movable to and away from a station near the mold 9. The carriage, for instance, may be provided with wheels travelling on rails 13, but the carriage may also be replaced by any other movable supporting platform. A platform or cover plate 14 is mounted on the carriage so as to be angularly movable about horizontally disposed hinges 15 or any other pivot means.

Figure 3:
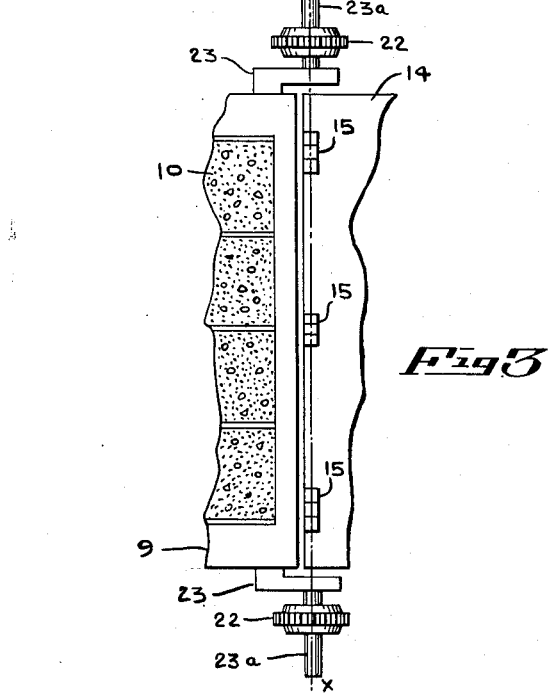
Fig. 3 is a fragmentary large scale plan view showing a detail illustrated in Fig. 2.

In the operation of producing the molded boards, the container 3 is first moved over the mold depressions 10 into the position indicated by the broken lines A, whereby the depressions will be charged with the ready mixed molding material 4 (the pulverulent material and binding agent), possibly while simultaneously vibrating the same, after which the container 3 is retracted again. The carriage 12 then occupies its position closely adjacent to the mold 9, the axis of the hinges 15 being substantially coaxial with the axis of the trunnions 23a coinciding in the line X—X (Fig. 3). Then the platform or cover plate 14 is rotated about 180° about its hinges 15 so that it will rest on the top of the mold 9. In this position the cover plate or platform 14 is retained in place by any suitable clamping elements indicated at 16 after which the mold together with the cover plate 14 are rotated through 180° about the axis of coincidence X—X of the trunnions 23a in the bearings 23b into an inverted position in which the cover plate or platform 14 again will rest on top of the carriage 12. The cover plate or platform 14 is now released from the mold, and the latter is turned back into its position right side up to receive fresh charges. Remaining on the carriage 12 are the molded boards 17 resting on the cover plate or platform 14, thus enabling these boards independently of the mold to be conveyed to any desired station for further treatment.

It is to be understood that the invention is not restricted to the embodiment hereinbefore described in conjunction with the accompanying drawing, but is susceptible of various modifications without departing from the scope of the invention.

In case of producing boards for feeders or sinkhead boxes no substantial pressure is exerted on the mixture of pulverulent combustible material and binding agent in the molds, so that the resulting combustible boards will be porous to a high degree.

What I claim is:

1. A machine for the production of molded boards from finely divided material, comprising in combination, a frame, a mold having a plane surface and having in said surface at least one mold depression, said mold being hinged to said frame and being tiltable about a horizontal hinge axis adjacent an edge of said mold between a first position wherein said surface is disposed substantially horizontally and said depression is open on top and a second position for the discharge of the molded board from said mold, said second position being disposed at an angle larger than a right angle relative to said first position, a carriage having a cover pivoted near one side edge thereon and being movable to and from a station adjacent said mold wherein said pivot axis substantially coincides with said hinge axis, and means for rotating said mold between said first and second positions, whereby, when said mold is in said first position and said carriage in said station, said cover may be tilted about said coinciding axis to abut against said surface to cover said depression, thereafter said mold may be tilted with said cover to said second position to discharge the molded board onto said cover, and subsequently said mold may be returned alone to said first position.

2. A machine according to claim 1, wherein retaining elements are provided for locking said cover plate to the mold in a position on top of the same, said cover plate being in this position, rotatable together with said mold into an inversed position in which said cover plate is resting on said movable carriage.

3. In a machine, as claimed in claim 1, said frame including a table, said mold surface being in said first position substantially flush with said table, a movable container for said molding material, and means for moving said container along said table above said depression for charging material thereinto.

4. A machine for the production of molded boards from finely divided material, comprising in combination, a frame, a mold having a plane surface and having in said surface mold depressions, said mold being hinged to said frame and being tiltable about a horizontal hinge axis adjacent an edge of said mold between a first position wherein said surface is disposed substantially horizontally and said depressions are open on top and a second position for the discharge of the molded board from said mold, said second position being disposed at an angle of substantially 180° relative to said first position, a carriage having a cover pivoted near one side edge thereon and being movable to and from a station adjacent said mold wherein said pivot axis substantially coincides with said hinge axis, and means for rotating said mold between said first and said second positions, whereby, when said mold is in said first position and said carriage in said station, said cover may be tilted about said coinciding axis to abut against said surface to cover said depressions, thereafter said mold may be tilted with said cover to said second position to discharge the molded boards onto said cover, and subsequently said mold may be returned alone to said first position.

References Cited in the file of this patent
UNITED STATES PATENTS

| | | |
|---|---|---|
| 1,798,826 | Wieghardt | Mar. 31, 1931 |
| 2,033,411 | Carson | Mar. 10, 1936 |
| 2,691,190 | Bethe et al. | Oct. 12, 1954 |
| 2,701,904 | Roensch | Feb. 15, 1955 |